May 15, 1956     F. M. POTTER     2,746,005
CURRENT REGULATOR

Filed April 30, 1953     2 Sheets-Sheet 1

INVENTOR.
FREDERICK M. POTTER
BY
ATTORNEY

May 15, 1956 F. M. POTTER 2,746,005
CURRENT REGULATOR

Filed April 30, 1953 2 Sheets-Sheet 2

INVENTOR.
FREDERICK M. POTTER
BY
*James M. Nickels*
ATTORNEY

United States Patent Office 2,746,005
Patented May 15, 1956

2,746,005

CURRENT REGULATOR

Frederick M. Potter, Westwood, N. J., assignor to Bendix Aviation Corporation, Teterboro, N. J., a corporation of Delaware Application April 30, 1953, Serial No. 352,143

5 Claims. (Cl. 322—27)

The present invention relates to dynamo-electric machines and more particularly to temperature compensation in the regulation of dynamo-electric machines.

In regulating current in a dynamo-electric machine, the voltage drop across the interpole and compensating windings is utilized to sense the current flowing therein and to energize the control coil of a regulator. At a given machine winding temperature, the voltage drop across the interpole and compensating windings is proportional to the current flowing therein, which is an indication of the generator output current. It has been found, however, that the machine winding resistance increases as the machine heats up resulting in a non-linear relationship of line current to regulator current.

The present invention provides a novel arrangement for compensating for changes in resistance in the machines windings due to temperature changes. A resistance of copper wire is wound non-inductively and located in intimate contact with the end extensions of the machine's compensating winding. The compensating resistor is connected in series with the regulator winding and forms a large part of the total resistance of the regulator winding circuit. The resistance of the compensating resistor being a function of temperature will maintain a substantially constant ratio to the resistance of the interpole and compensating windings over a wide range of temperature.

It is an object of the present invention to provide improved regulation for a dynamo-electric machine.

Another object of the invention is to provide novel means for sensing temperature changes in the windings of a dynamo-electric machine.

Another object of the invention is to provide improved current regulation for a dynamo-electric machine that is independent of ambient temperature changes.

Another object of the invention is to provide novel means whereby the ratio of current in the regulator winding to the line current is substantially constant.

Another object of the invention is to provide sensing for output current regulation with a minimum power consumption.

The above and other objects and features of the invention will appear more fully hereinafter from a consideration of the following description taken in connection with the accompanying drawing wherein one embodiment of the invention is illustrated by way of example.

Figure 1:
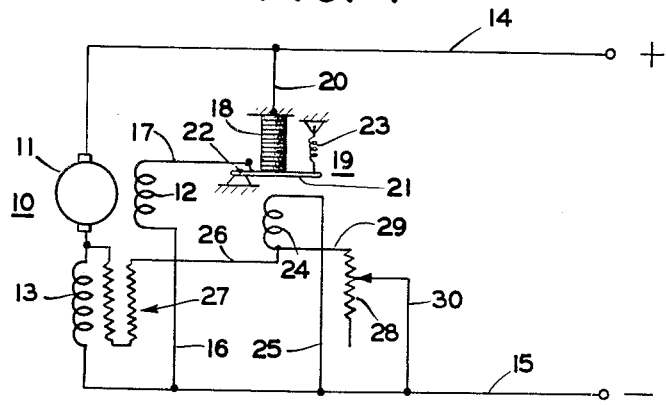
Figure 1 is a simplified schematic diagram of a system embodying the invention.

Referring now to the drawings, wherein similar parts in the various figures have been assigned the same reference numerals, in Figure 1 a generator is indicated generally by the numeral 10 and has armature 11, shunt field winding 12 and interpole and compensating windings 13. The armature 11 of generator 10 has one output brush connected to output line 14 and the other output brush is connected through interpole and compensating winding 13 to output line 15.

One side of the shunt field winding 12 is connected by conductor 16 to the output line 15 and the other side of the winding 12 is connected by conductor 17 to one side of a carbon pile element 18 of a current regulator indicated generally by the numeral 19. The other side of the element 18 is connected by a conductor 20 to the output line 14.

The regulator 19 is shown diagrammatically as including an armature 21 pivoted at 22 and biased under tension of a spring 23 in a direction tending to decrease the resistance of the carbon pile 18. An electro-magnetic winding 24 biases the armature 21 in a direction opposing the spring 23 tending to increase the resistance of the carbon pile 18.

The winding 24 is connected across the interpole and compensating windings 13 by conductor 25, conductor 26, and compensating resistor 27. A variable shunt 28 is connected across the winding 24 by conductors 29 and 30.

Figure 2:
Figure 2 is a view of the compensating resistor before being formed.
Figure 3:
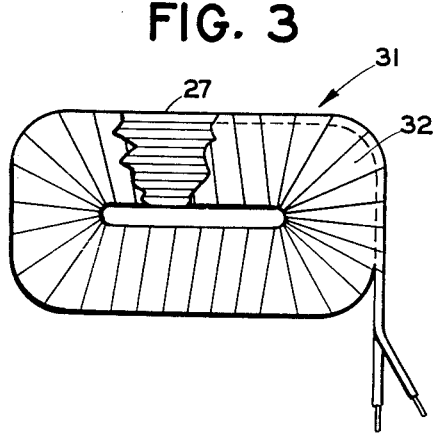
Figure 3 is a view of the resistor Figure 2 after forming.

The compensating resistor 27 is made up of a length of copper wire (see Figure 2) which is doubled and formed into a coil 31 of a flat configuration as shown in Figure 3 and wound with insulation material 32.

Figure 4:
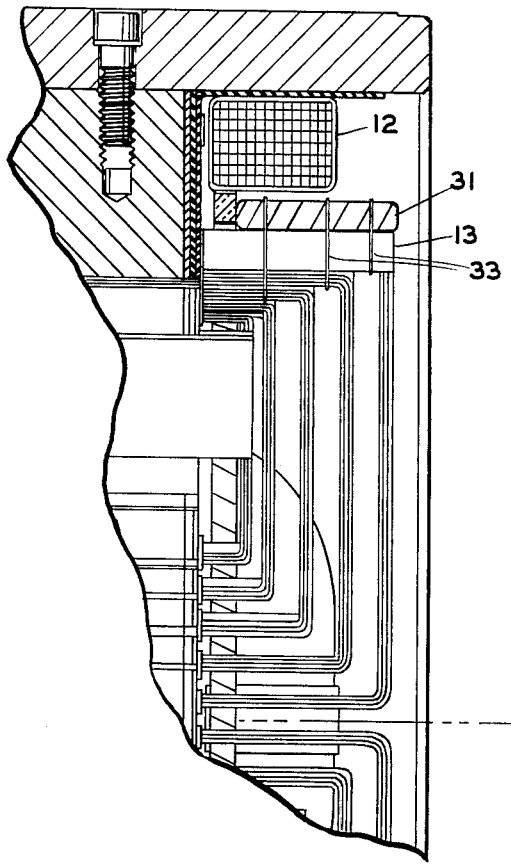
Figure 4 is a partial section view of a dynamo-electric machine embodying the invention.
Figure 5:
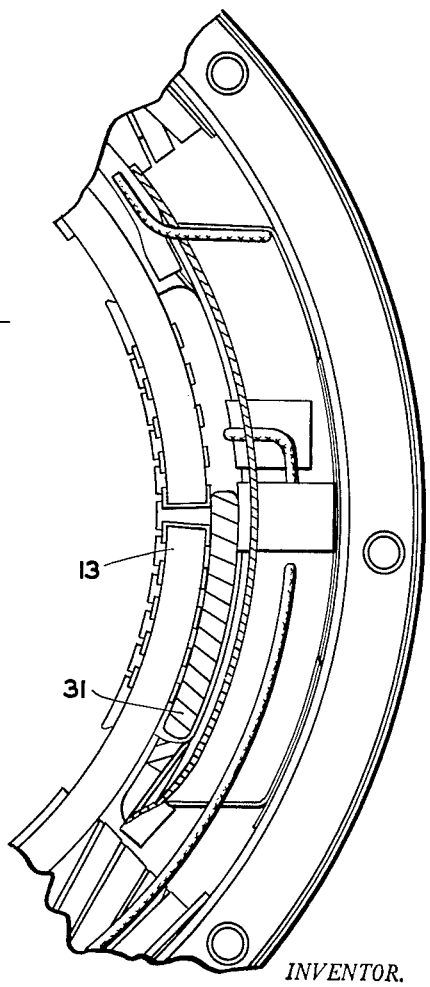
Figure 5 is a partial end view of a dynamo-electric machine embodying the invention.

Figures 4 and 5 illustrate the location of the coil 31 with reference to the windings 13. Ties 33 may be used to hold the coil 30 into intimate contact with the windings 13.

In operation, the power loss in the compensating resistor causes its temperature to increase. The resistor 27 is selected to have a shape and size together with the method of insulating to establish a temperature gradient between the interior of the coil 31 to the outside thereof. With the compensating resistor placed in intimate contact with the end extensions of the machines and extensions of the compensating or pole face windings, heat will flow from the resistor 27 to the windings 13. Inasmuch as the windings 13 form a sustantially larger mass than the resistor 27, they are aquivalent from a practical consideration to an infinite sump for the heat of the resistor 27. A temperature gradient is therefore established between the resistor and the machine windings. As the machine heats up, the compensating resistor will also increase its temperature, always maintaining a slightly higher temperature than the machines windings. This temperature differential enables the resistor to compensate for the resistance of the regulator coil.

The temperature of the windings increase and thereby the resistance, the resistance of the compensating resistor also increases. Since the resistance of copper is a definite function of temperature, the resistance of the compensating resistor will maintain substantially a constant ratio to the resistance of the interpole and compensating windings. By maintaining a substantially constant ratio between the output current and the current in the control winding of the regulator, the regulation of the output current is not affected by temperature changes.

The variable shunt 28 provides means of selecting the value of output current to be maintained. The regulator itself, regulates the coil current only. By diverting some current through the variable shunt 28, the value of regulated output current can be adjusted.

Although a generator system is illustrated having only current regulation, it is understood that it could include voltage regulation and other control devices such as are well known in the art.

Although only one embodiment of the invention has been illustrated and described, various changes in the form and relative arrangement of the parts, which will now appear to those skilled in the art, may be made without departing from the scope of the invention.

What is claimed is:

1. Current regulating means for a generator having a shunt winding, interpole and compensating windings, comprising a carbon pile resistance element for varying the energization of said shunt winding, a control winding for said carbon pile element, and circuit means including a compensating resistor connecting said control winding across said interpole and compensating windings, said compensating resistor being formed of a length of copper wire wound non-inductively and positioned in intimate contact with said compensating winding.

2. Current regulating apparatus for a generator having a shunt winding, interpole and compensating windings, comprising a variable resistance element for controlling the energization of said shunt winding, a control winding for said variable resistance element, circuit means including a compensating resistor connecting said control winding to sense the current flowing in said compensating winding, said resistor being of a substance having substantially the same temperature coefficient as said compensating winding and having a mass substantially less than said compensating winding, and means for holding said compensating resistor into intimate contact with said compensating windings, whereby the ratio between the resistance of said compensating winding and said compensating resistor remains substantially constant with variations in temperature.

3. Current regulating apparatus for use in a generator having a regulating field, interpole and compensating fields, comprising a carbon pile element in circuit with said regulating field for varying the energization thereof, a control winding for said carbon pile element, a circuit including compensating means for connecting said winding for energization in accordance with the current flowing in said interpole and compensating fields, said compensating means being a flat noninductive coil having a temperature characteristic substantially similar to the temperature characteristics of said fields and positioned in heat exchanging relationship with said compensating field.

4. Current regulating apparatus for use with a generator having a regulating winding, interpole winding and compensating winding, comprising a current regulator for controlling the energization of said regulating winding, a control winding responsive to current flowing in said interpole and compensating windings to vary said regulator in accordance with said current, and means responsive to changes in temperature of said compensating winding to maintain a substantially constant ratio between the current flowing in said regulating, interpole and compensating windings and the current flowing in said control winding.

5. The combination as set forth in claim 4 in which said means is a length of copper wire, wound non-inductive to form a flat coil and positioned adjacent said compensating winding.

References Cited in the file of this patent

UNITED STATES PATENTS

| | | |
|---|---|---|
| 2,427,440 | Buell | Sept. 16, 1947 |
| 2,496,742 | Neild | Feb. 7, 1950 |